United States Patent

Hirano

Patent Number: 5,155,632
Date of Patent: Oct. 13, 1992

[54] COPYING LENS SYSTEM

[75] Inventor: Hiroyuki Hirano, Tokyo, Japan

[73] Assignee: Asahi Kogaku Kogyo K.K., Tokyo, Japan

[21] Appl. No.: 774,858

[22] Filed: Oct. 11, 1991

[30] Foreign Application Priority Data

Oct. 12, 1990 [JP] Japan .................................. 2-274778

[51] Int. Cl.⁵ .............................................. G02B 9/14
[52] U.S. Cl. .................................... 359/790; 359/785; 359/784
[58] Field of Search ........................ 359/790, 785, 784

[56] References Cited

U.S. PATENT DOCUMENTS

| | | |
|---|---|---|
| 2,279,372 | 4/1942 | Herzberger . |
| 3,640,607 | 2/1972 | Conrad . |
| 4,522,471 | 6/1985 | Nishioka . |
| 4,542,961 | 9/1985 | Sato .................................. 359/790 |
| 4,892,398 | 1/1990 | Kudo et al. . |

FOREIGN PATENT DOCUMENTS

| | | |
|---|---|---|
| 55-81316 | 6/1980 | Japan . |
| 60-51091 | 11/1985 | Japan . |
| 63-32511 | 2/1988 | Japan .................................. 359/784 |
| 63-180924 | 7/1988 | Japan . |
| 1-261614 | 10/1989 | Japan . |
| 532950 | 2/1941 | United Kingdom . |
| 917891 | 1/1960 | United Kingdom . |
| 1410733 | 10/1975 | United Kingdom . |

Primary Examiner—Paul M. Dzierzynski
Assistant Examiner—Hung Xuan Dang
Attorney, Agent, or Firm—Sughrue, Mion, Zinn, Macpeak & Seas

[57] ABSTRACT

A copying lens system of a three-unit/three-element composition that can be made from relatively inexpensive optical materials and which exhibits satisfactory performance at copying ratios ranging from about 0.5 to 2.0. The lens system includes, in order from the object side, a first lens of positive meniscus having a convex surface directed to the object, a negative second lens having a concave surface on both sides, and a positive third lens having a convex surface on both sides. The lens system satisfies the following conditions:

(1) $1.70 < n_1 + \nu_1/200 \leq 1.93$
(2) $0.10 < n_3 - n_1$
(3) $0.06 < d_t/f_t\ 0.11$
(4) $0.60 < -r_3/r_4 < 1.05$
(5) $1.40 < -r_5/r_6 < 2.70$ where
$f_t$: the focal length of the overall system;
$n_i$: the refractive index of the ith lens at the d-line;
$\nu_i$: the Abbe number of the $i^{th}$ lens;
$r_j$: the radio of the curvature of the $j^{th}$ lens; and
$d_t$: the overall length of the system.

5 Claims, 8 Drawing Sheets

COPYING LENS SYSTEM

BACKGROUND OF THE INVENTION

This application is based on and claims priority from Japanese Application No. Hei. 2-274778 filed Oct. 12, 1990, the disclosure of which is incorporated herein.

FIELD OF THE INVENTION

The present invention relates to a copying lens system of a three-unit/three-element composition that exhibits good performance at copying ratios ranging from about 0.5 to 2.0.

BACKGROUND

With the increasing demand for manufacturing smaller copying machines at a lower cost, the need has arisen to use smaller and less costly copying lens systems. Two major approaches for realizing such a lens systems are a symmetrical type of lens system having a four-unit/four-element composition that has an $F_{no}$ of about 5.6 as proposed in Examined Japanese Patent Publication No. 51091/1985, and an asymmetrical type lens system having a three-unit/three-element composition that uses the minimum necessary number of lens elements to obtain a flat image and that has an $F_{no}$ of 1:8 as proposed in Unexamined Published Japanese Patent Application No. 180924/1988.

However, the conventional copying lens system of a three-unit/three-element composition is difficult to manufacture at a low cost since the individual lens elements have high refractive indices and, therefore, cannot be made of inexpensive optical materials. On the other hand, the conventional four-unit/four-element composition is disadvantageous in that it is not compact.

SUMMARY OF THE INVENTION

The object of the present invention is to provide a copying lens system of a three-unit/three-element composition that can be made from relatively inexpensive optical materials and which exhibits satisfactory performance at copying ratios ranging from about 0.5 to 2.0.

This object of the present invention has been attained by a copying lens system of a three-unit/three-element composition which comprises, in order from the object side, a first lens element of positive meniscus having a convex surface directed to the object, a negative second lens having a concave surface on both sides, and a positive third lens having a convex surface on both sides, which lens system satisfies the following conditions:

(1) $1.70 < n_1 + \nu_1/200 \leq 1.93$
(2) $0.10 < n_3 - n_1$
(3) $0.06 < d_t/f_t < 0.11$
(4) $0.60 < -r_3/r_4 < 1.05$
(5) $1.40 < -r_5/r_6 < 2.70$ where
$f_t$: the focal length of the overall system;
$n_i$: the refractive index of the ith lens at the d-line;
$\nu_i$: the Abbe number of the $i^{th}$ lens;
$r_j$: the radio of the curvature of the $j^{th}$ lens; and
$d_t$: the overall length of the system.

DETAILED DESCRIPTION OF PREFERRED EMBODIMENTS

The compositions of the copying lens systems according to four examples of the present invention are described below with reference to drawings and tables.

The copying lens systems according to the four examples are used for copying at ratios ranging from about 0.5 (reduction) to 2.0 (enlargement) including size-for-size, having a brightness on the order of $F_{no}$ 1:8.5 and capable of covering half-view angles of up to about 22 degrees, with the focal length of the overall system being 100 mm.

FIGS. 1, 3, 5 and 9 show the lens arrangements of examples one through four, respectively, in which the first lens element $L_1$, the second lens element $L_2$ and the third lens element $L_3$ are arranged in the stated order from the object side. The first lens element $L_1$ is a positive meniscus lens having a convex surface directed toward the object, the second lens element $L_2$ is a negative lens having a concave surface on both sides, thereof and the third lens element $L_3$ is a positive lens having a convex surface on both sides thereof.

Figure 1:
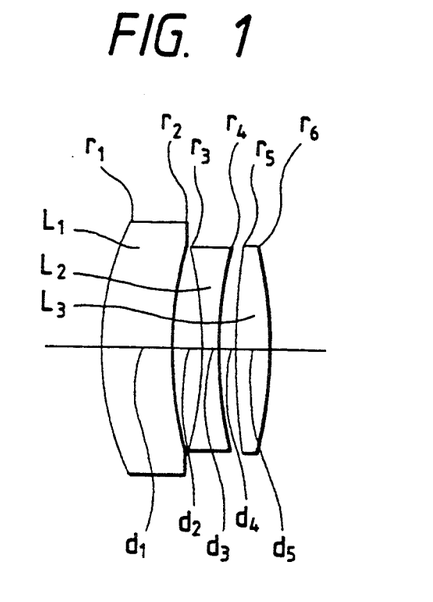
FIG. 1 is a simplified cross-sectional view of the copying lens system according to Example 1 of the present invention.
Figure 2:
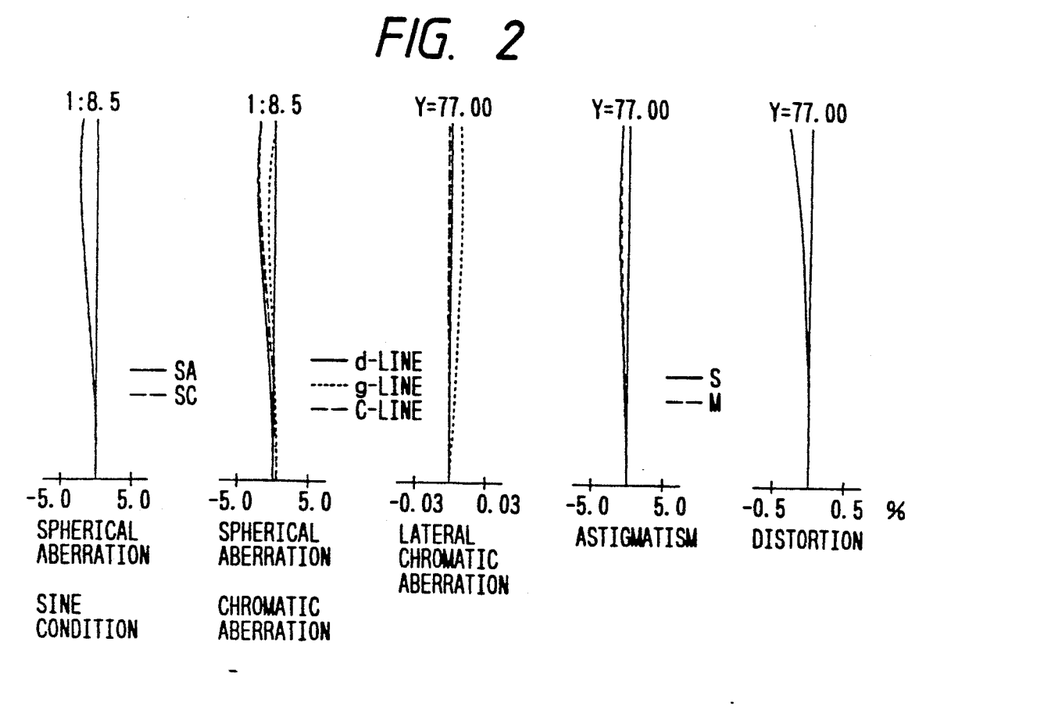
FIG. 2 is a graph plotting the aberration curves obtained by the lens system of Example 1 at a copying ratio of 1.0.
Figure 3:
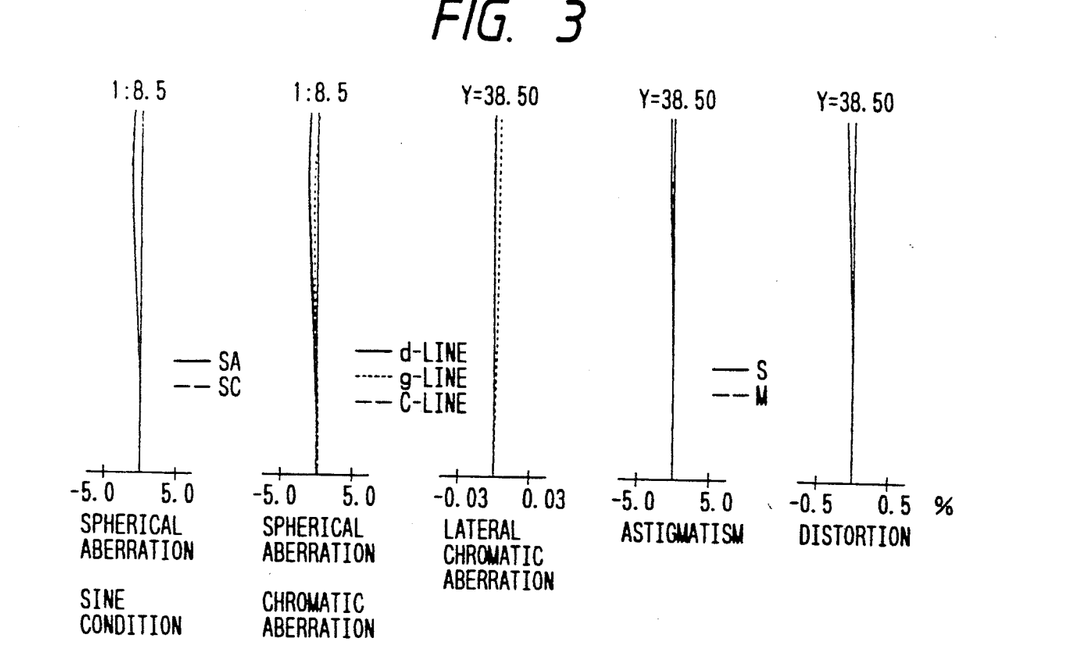
FIG. 3 is a graph plotting the aberration curves obtained by the lens system of Example 1 at a copying ratio of 0.5.
Figure 4:
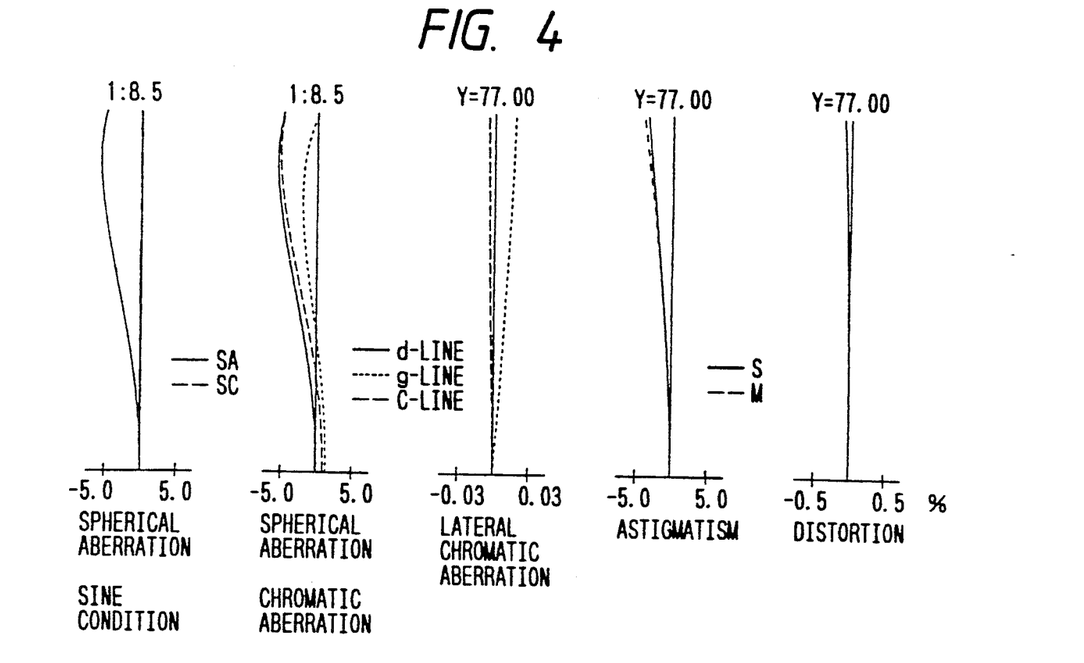
FIG. 4 is a graph plotting the aberration curves obtained by the lens system of Example 1 at a copying ratio of 2.0.
Figure 5:
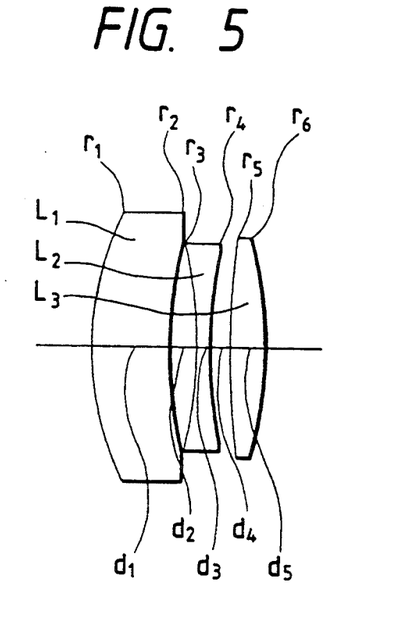
FIG. 5 is a simplified cross-sectional view of the copying lens system according to Example 2 of the present invention.
Figure 6:
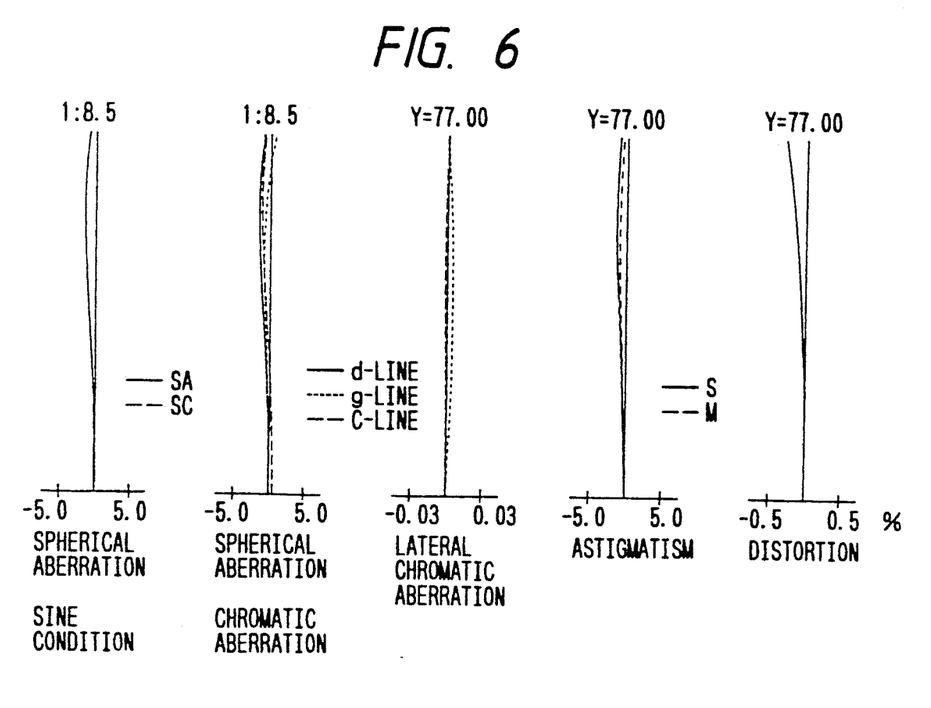
FIG. 6 is a graph plotting the aberration curves obtained by the lens system of Example 2 at a copying ratio of 1.0.
Figure 7:
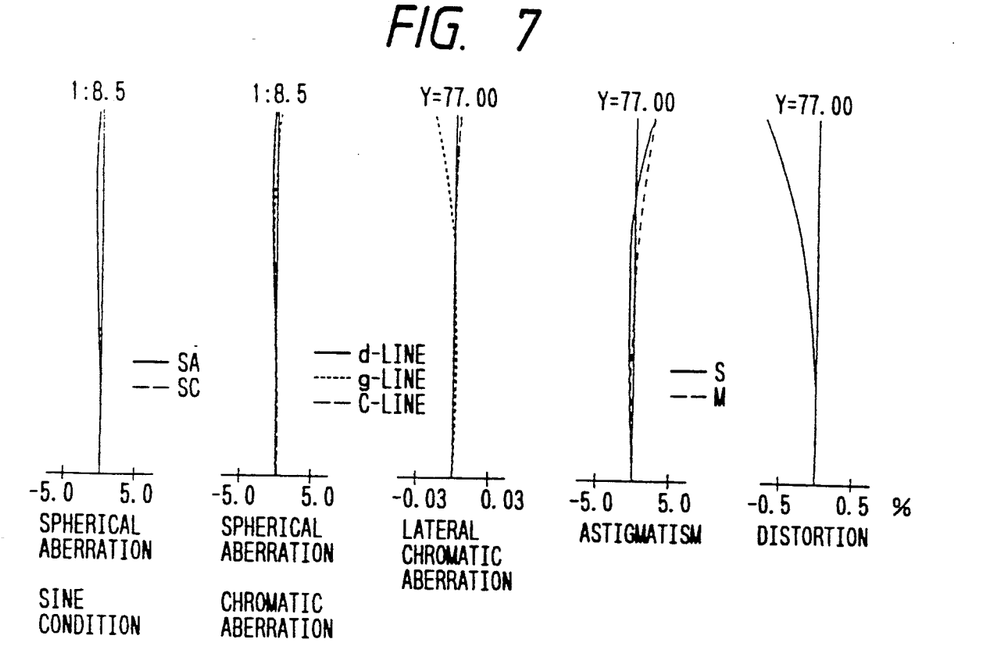
FIG. 7 is a graph plotting the aberration curves obtained by the lens system of Example 2 at a copying ratio of 0.5.
Figure 8:
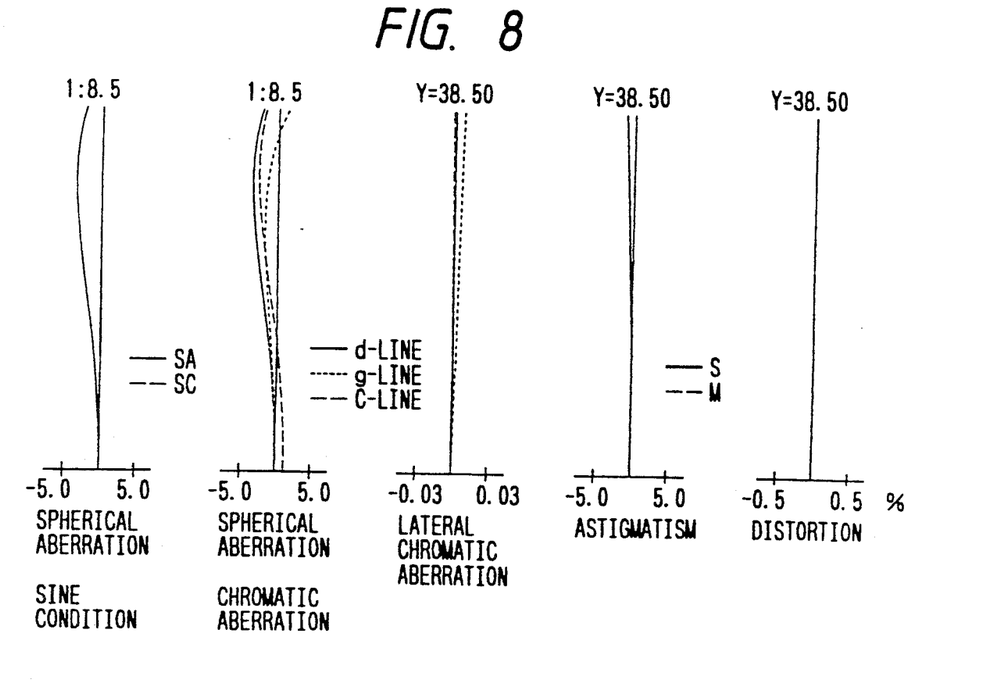
FIG. 8 is a graph plotting the aberration curves obtained by the lens system of Example 2 at a copying ratio of 2.0.
Figure 9:
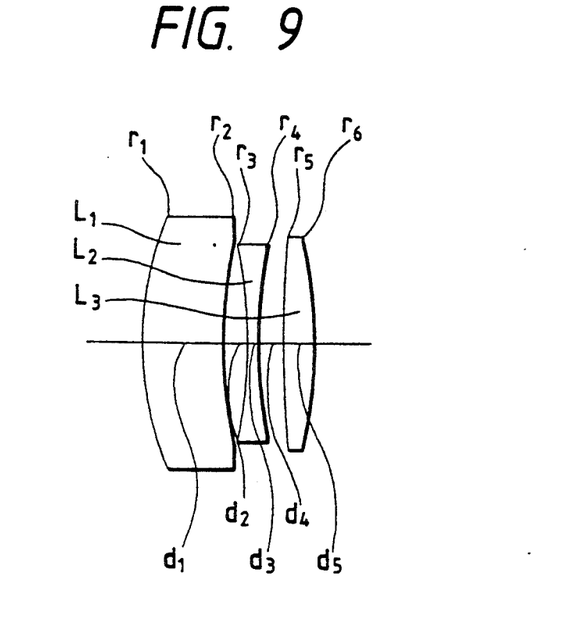
FIG. 9 is a simplified cross-sectional view of the copying lens system according to Example 3 of the present invention.
Figure 10:
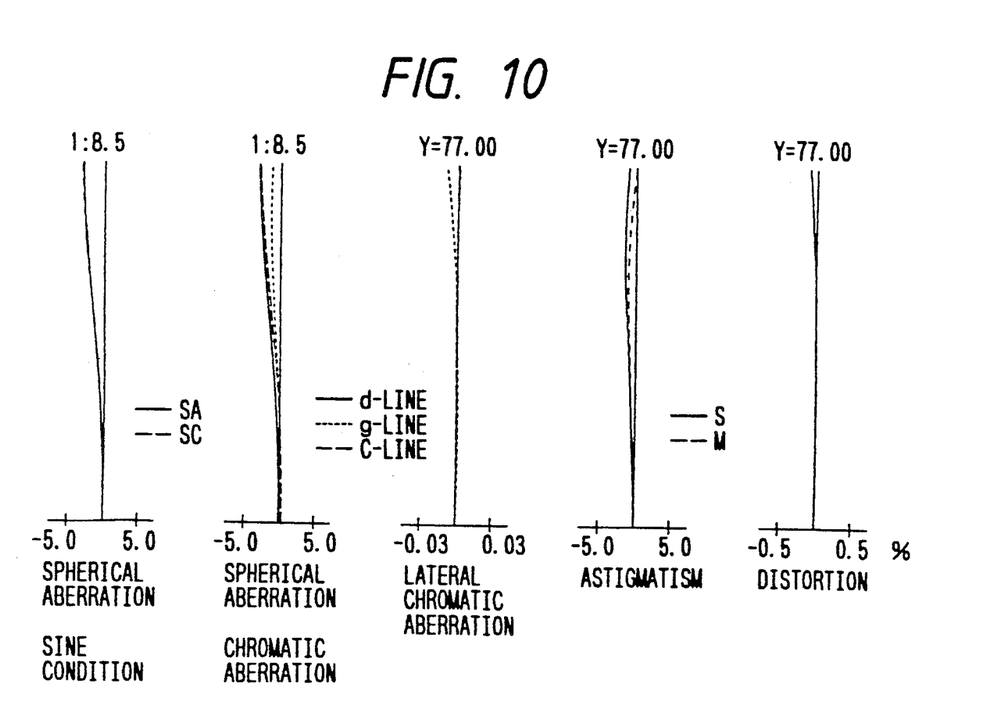
FIG. 10 is a graph plotting the aberration curves obtained by the lens system of Example 3 at a copying ratio of 1.0.
Figure 11:
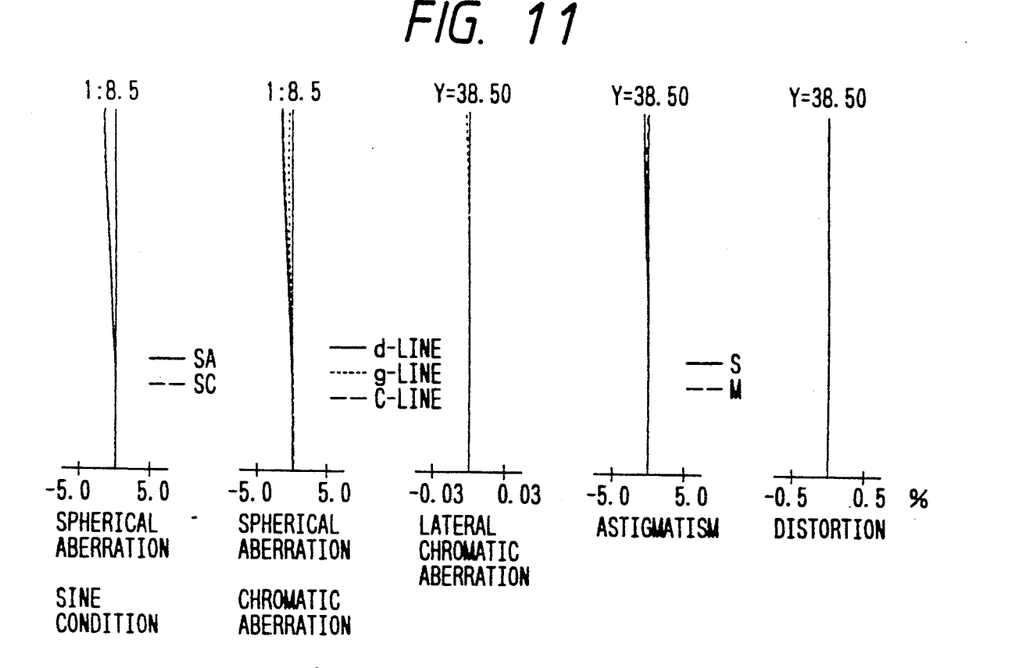
FIG. 11 is a graph plotting the aberration curves obtained by the lens system of Example 3 at a copying ratio of 0.5.
Figure 12:
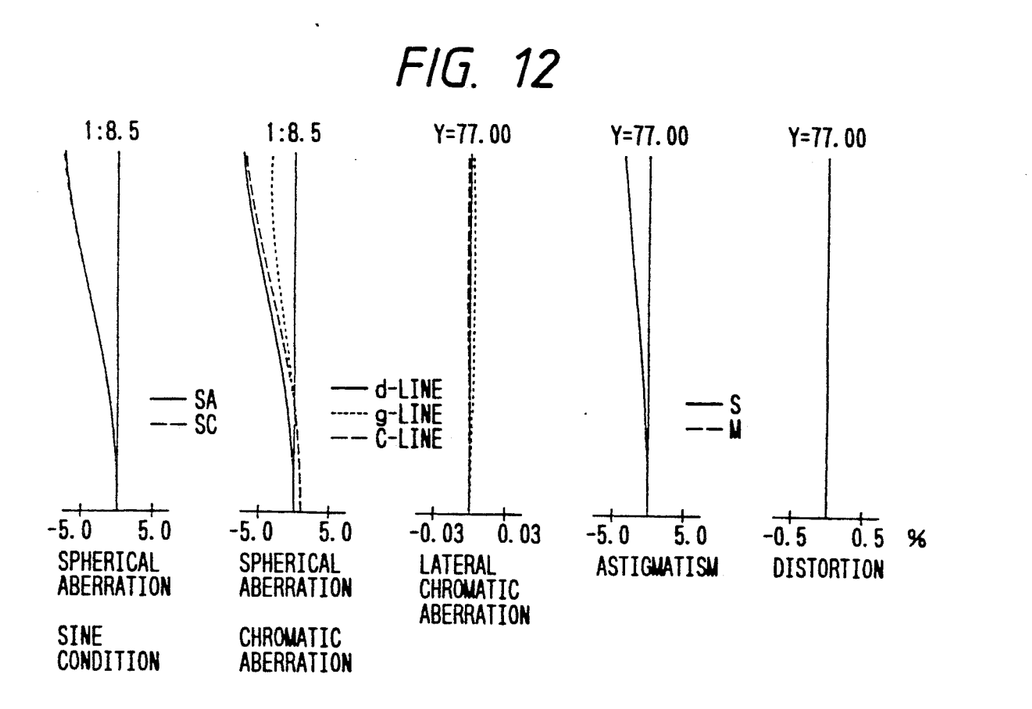
FIG. 12 is a graph plotting the aberration curves obtained by the lens system of Example 3 at a copying ratio of 2.0.
Figure 13:
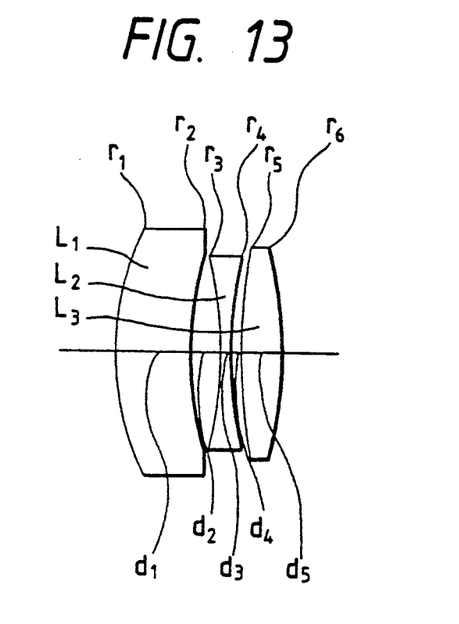
FIG. 13 is a simplified cross-sectional view of the copying lens system according to Example 4 of the present invention.
Figure 14:
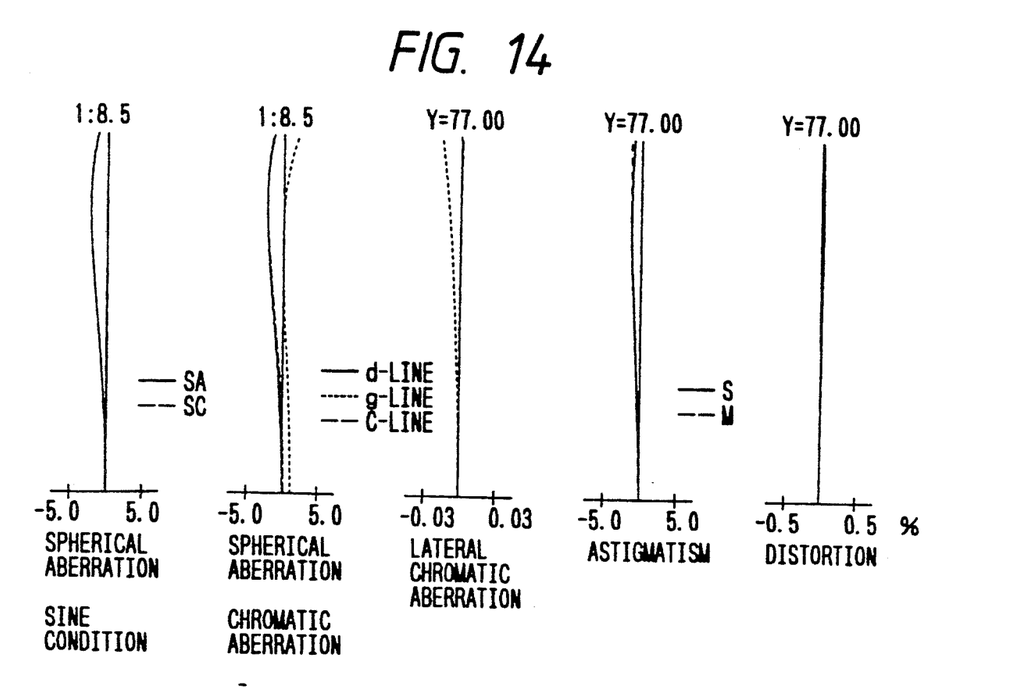
FIG. 14 is a graph plotting the aberration curves obtained by the lens system of Example 4 at a copying ratio of 1.0.
Figure 15:
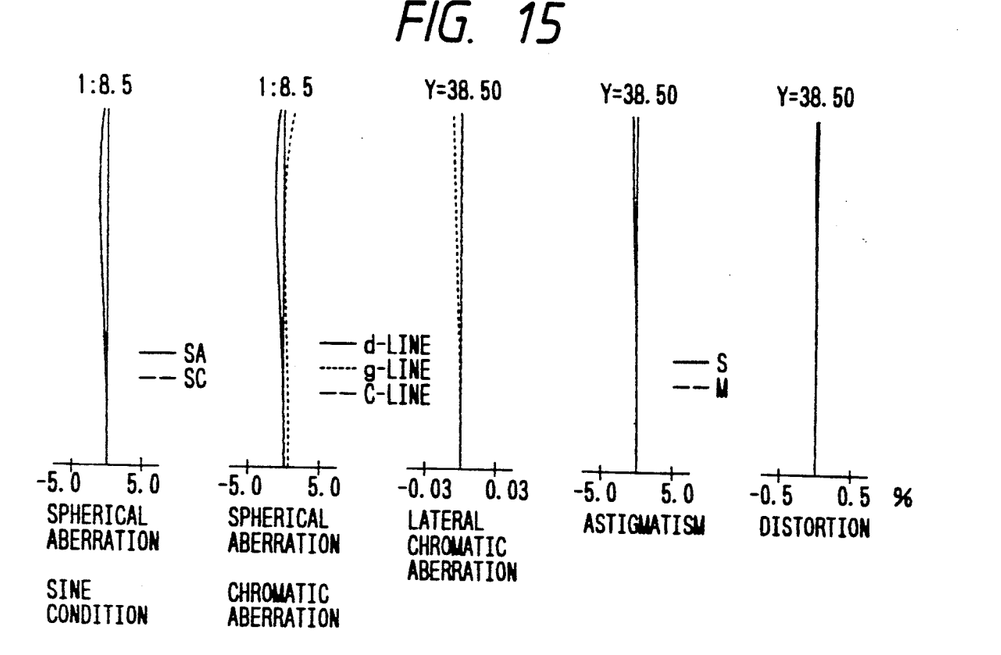
FIG. 15 is a graph plotting the aberration curves obtained by the lens system of Example 4 at a copying ratio of 0.5.
Figure 16:
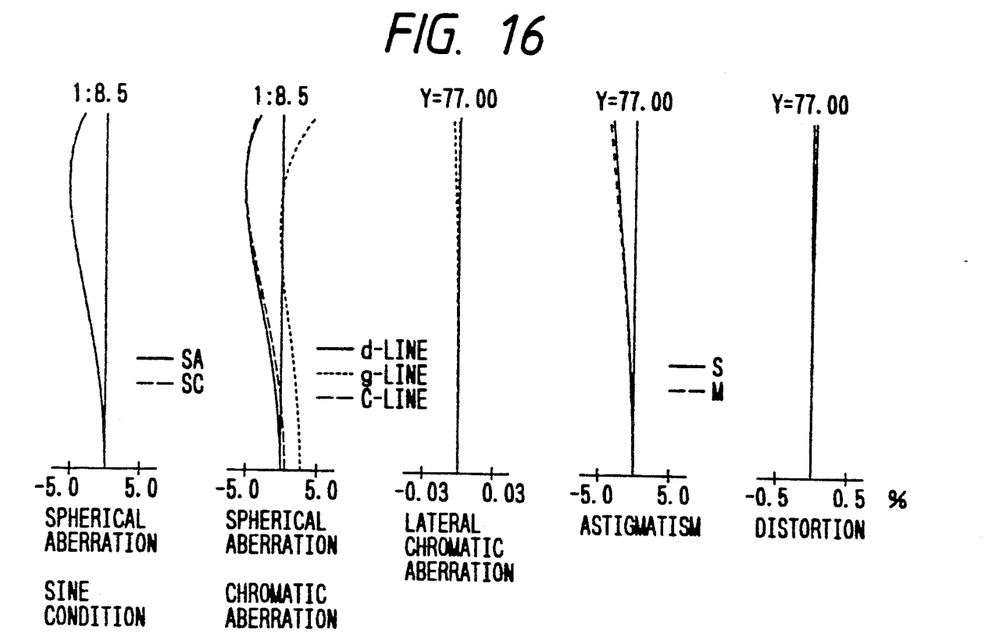
FIG. 16 is a graph plotting the aberration curves obtained by the lens system of Example 4 at a copying ratio of 2.0.

Graphs plotting the aberration curves obtained at copying ratios of 1.0, 0.5 and 2.0 are shown in FIGS. 2-4 for Example 1; in FIGS. 6-8 for Example 2; in FIGS. 10-12 for Example 3; and in FIGS. 11-14 for Example 4.

In Tables 1-4, which show the design specifications of Examples 1 to 4, r denotes the radius of curvature (in millimeters) of individual lens surfaces, n signifies the refractive index of individual lenses, and $\nu$ denote their Abbe numbers.

Each of the copying lens systems according to Examples 1-4 of the present invention satisfies the following conditions:

(1) $1.70 < n_1 + \nu_1/200 \leq 1.93$
(2) $0.10 < n_3 - n_1$
(3) $0.06 < d_t/f_t < 0.11$
(4) $0.60 < -r_3/r_4 < 1.05$
(5) $1.40 < -r_5/r_6 < 2.70$ where
$f_t$: the focal length of the overall system;
$n_i$: the refractive index of the $i^{th}$ lens at the d-line;
$\nu_i$: the Abbe number of the $i^{th}$ lens;
$r_j$: the radio of the curvature of the $j^{th}$ lens; and
$d_t$: the overall length of the system.

The value of $n_1 + \nu_1/200$ in condition (1) relates to the refractive index and Abbe number of the first lens element. If this value exceeds its upper limit 1.93, the refractive index of the first lens element increases, which is favorable for the purpose of aberration compensation. However, as the refractive index increases, it becomes difficult to manufacture the first lens element of inexpensive optical materials, which is undesirable from an economic viewpoint. If the value becomes smaller than its lower limit, the refractive index of the first lens element is too low to achieve effective compensation for various aberrations.

The value of $n_3 - n_1$ in condition (2) is critical to ensure that the coma that occurs due to the reduced refractive index of the first lens element can be effectively compensated by the third lens element. If this value does not satisfy condition (2), effective compensation for the coma cannot be achieved.

The value of $d_t/f_t$ in condition (3) relates to the overall length of the lens system. If this value is smaller than its lower limit 0.06, a very compact system is realized but it becomes difficult to compensate for various aberrations. In contrast, if this value exceeds its upper limit 0.11, a condition favorable for copying performance will result but the overall size of the lens system is no less smaller than a system of a four-unit/four-element composition and the compact requirement cannot be met.

The value of $-r_3/r_4$ in condition (4) relates to the geometry of the second lens element. If this value exceeds its upper limit 1.05, the radius of curvature of the second surface of the second lens element decreases and it becomes difficult to suppress spherical aberration and coma. Conversely, if this value becomes smaller than its lower limit 0.60, not only is spherical aberration overcompensated but it also becomes difficult to achieve balanced compensation for astigmatism.

The value of $-r_5/r_6$ in condition (5) relates to the geometry of the third lens element. If this value exceeds its upper limit 2.70, the coma developing on the fourth lens surface will be undercompensated by the third lens element. If the value is smaller than its lower limit, overcompensation for coma will occur in the third lens element.

Table 1 below shows the design specifications of the copying lens system according to Example 1 of the present invention.

TABLE 1

| Surface No. | r | d | $n_3$ | $\nu$ | $n_1$ |
|---|---|---|---|---|---|
| 1 | 17.222 | 4.232 | 1.56883 | 56.3 | 1.56883 |
| 2 | 22.417 | 1.784 | — | — | — |
| 3 | −24.982 | 1.017 | 1.58144 | 40.8 | 1.58144 |
| 4 | 24.982 | 0.992 | — | — | — |
| 5 | 41.533 | 2.024 | 1.69350 | 53.2 | 1.69350 |
| 6 | −25.114 | — | — | — | — |

Table 2 below shows the design specifications of the copying lens system according to Example 2 of the present invention.

TABLE 2

| Surface No. | r | d | $n_3$ | $\nu$ | $n_1$ |
|---|---|---|---|---|---|
| 1 | 17.839 | 4.529 | 1.56883 | 56.3 | 1.56883 |
| 2 | 42.516 | 1.671 | — | — | — |
| 3 | −25.607 | 0.757 | 1.58144 | 40.8 | 1.58144 |
| 4 | 26.375 | 1.234 | — | — | — |
| 5 | 50.742 | 1.991 | 1.69350 | 53.2 | 1.69350 |
| 6 | −24.956 | — | — | — | — |

Table 3 below shows the design specifications of the copying lens system according to Example 3 of the present invention.

TABLE 3

| Surface No. | r | d | $n_3$ | $\nu$ | $n_1$ |
|---|---|---|---|---|---|
| 1 | 18.674 | 4.776 | 1.60311 | 60.7 | 1.60311 |
| 2 | 29.966 | 1.485 | — | — | — |
| 3 | −28.638 | 0.613 | 1.58144 | 40.8 | 1.58144 |
| 4 | 28.614 | 1.530 | — | — | — |
| 5 | 70.741 | 1.830 | 1.71300 | 53.8 | 1.71300 |
| 6 | −27.226 | — | — | — | — |

Table 4 below shows the design specifications of the copying lens system according to Example 4 of the present invention.

TABLE 4

| Surface No. | r | d | $n_3$ | $\nu$ | $n_1$ |
|---|---|---|---|---|---|
| 1 | 16.443 | 4.453 | 1.51633 | 64.1 | 1.51633 |
| 2 | 20.855 | 1.799 | — | — | — |
| 3 | −23.980 | 0.564 | 1.62004 | 36.3 | 1.62004 |
| 4 | 23.980 | 0.656 | — | — | — |
| 5 | 35.612 | 2.306 | 1.74400 | 44.8 | 1.74400 |
| 6 | −25.046 | — | — | — | — |

Table 5 lists the values taken by the copying lens systems of Examples 1-4 in connection with the above-discussed conditions (1)-(5).

TABLE 5

| Condition | Ex. 1 | Ex. 2 | Ex. 3 | Ex. 4 |
|---|---|---|---|---|
| (1) | 1.85 | 1.85 | 1.91 | 1.84 |
| (2) | 0.12 | 0.12 | 0.11 | 0.23 |
| (3) | 0.10 | 0.10 | 0.10 | 0.10 |
| (4) | 1.00 | 0.97 | 1.00 | 1.00 |
| (5) | 1.65 | 2.03 | 2.60 | 1.42 |

Thus, each of the copying lens systems of Examples 1-4 satisfies the following conditions of the present invention:

(1) $1.70 < n_1 + \nu_1/200 \leq 1.93$
(2) $0.10 < n_3 - n_1$
(3) $0.06 < d_t/f_t < 0.11$
(4) $0.60 < -r_3/r_4 < 1.05$
(5) $1.40 < -r_5/r_6 < 2.70$ As demonstrated by Examples 1-4, the present invention permits the use of low-index optical materials in manufacturing the first lens element of a copying lens system of a three-unit/three-element composition contributing to a substantial reduction in the manufacturing cost. In addition, the copying lens system of the present invention exhibits satisfactory performance at copying ratios over a wide range of 0.5-2.0.

Having the construction described above, the copying lens system of the present invention permits the use of inexpensive optical materials that have somewhat lower refractive indices than those used in the first lens element of the conventional version of a three-unit/three-element composition. Accordingly, the lens system of the present invention is compact and yet the cost of the first lens element can be reduced to about one quarter to a tenth of heretofore necessary costs. Furthermore, this lens system exhibits satisfactory copying performance at ratios over the wide range from 0.5 to 2.0.

What is claimed is:

1. A copying lens system of a three-unit/three-element composition comprising, in order from the object side, a first lens of positive meniscus having a convex surface directed to the object, a negative second lens having a concave surface on both sides, and a positive third lens having a convex surface on both sides, which lens system satisfies the following conditions:

(1) $1.70 < n_1 + \nu_1/200 \leq 1.93$
(2) $0.10 < n_3 - n_1$
(3) $0.06 < d_t/f_t < 0.11$
(4) $0.60 < -r_3/r_4 < 1.05$
(5) $1.40 < -r_5/r_6 < 2.70$ wherein $f_t$: the focal length of the overall system;
$n_i$: the refractive index of the $i_{th}$ lens at the d-line;
$\nu_i$: the Abbe number of the $i^{th}$ lens;
$r_j$: the radio of the curvature of the jth lens; and
$d_t$: the overall length of the system.

2. The lens system of claim 1 wherein said lenses satisfy the following parameters:

| Surface No. | r | d | $n_3$ | $\nu$ | $n_1$ |
|---|---|---|---|---|---|
| 1 | 17.222 | 4.232 | 1.56883 | 56.3 | 1.56883 |
| 2 | 22.417 | 1.784 | — | — | — |
| 3 | −24.982 | 1.017 | 1.58144 | 40.8 | 1.58144 |
| 4 | 24.982 | 0.992 | — | — | — |
| 5 | 41.533 | 2.024 | 1.69350 | 53.2 | 1.69350 |
| 6 | −25.114 | — | — | — | — |

3. The lens system of claim 1, wherein said lenses satisfy the following parameters:

| Surface No. | r | d | $n_3$ | $\nu$ | $n_1$ |
|---|---|---|---|---|---|
| 1 | 17.839 | 4.529 | 1.56883 | 56.3 | 1.56883 |
| 2 | 24.516 | 1.671 | — | — | — |
| 3 | −25.607 | 0.757 | 1.58144 | 40.8 | 1.58144 |
| 4 | 26.375 | 1.234 | — | — | — |
| 5 | 50.742 | 1.991 | 1.69350 | 53.2 | 1.69350 |
| 6 | −24.956 | — | — | — | — |

4. The lens system of claim 1 wherein said lenses satisfy the following parameters:

| Surface No. | r | d | $n_3$ | $\nu$ | $n_1$ |
|---|---|---|---|---|---|
| 1 | 18.674 | 4.776 | 1.60311 | 60.7 | 1.60311 |
| 2 | 29.966 | 1.485 | — | — | — |
| 3 | −28.638 | 0.613 | 1.58144 | 40.8 | 1.58144 |
| 4 | 28.614 | 1.530 | — | — | — |
| 5 | 70.741 | 1.830 | 1.71300 | 53.8 | 1.71300 |
| 6 | −27.226 | — | — | — | — |

5. The lens system of claim 1 wherein said lenses satisfy the following parameters:

| Surface No. | r | d | $n_3$ | $\nu$ | $n_1$ |
|---|---|---|---|---|---|
| 1 | 16.443 | 4.453 | 1.51633 | 64.1 | 1.51633 |
| 2 | 20.855 | 1.799 | — | — | — |
| 3 | −23.980 | 0.564 | 1.62004 | 36.3 | 1.62004 |
| 4 | 23.980 | 0.656 | — | — | — |
| 5 | 35.612 | 2.306 | 1.74400 | 44.8 | 1.74400 |
| 6 | −25.046 | — | — | — | — |

* * * * *